United States Patent
Sundquist

(10) Patent No.: US 10,775,267 B2
(45) Date of Patent: Sep. 15, 2020

(54) CONDITION MONITORING SYSTEM

(71) Applicant: AKTIEBOLAGET SKF, Gothenburg (SE)

(72) Inventor: Fredrik Sundquist, Luleå (SE)

(73) Assignee: Aktiebolaget SKF, Gothenburg (SE)

(*) Notice: Subject to any disclaimer, the term of this patent is extended or adjusted under 35 U.S.C. 154(b) by 552 days.

(21) Appl. No.: 14/381,472

(22) PCT Filed: Feb. 18, 2013

(86) PCT No.: PCT/SE2013/000023
§ 371 (c)(1),
(2) Date: Aug. 27, 2014

(87) PCT Pub. No.: WO2013/129989
PCT Pub. Date: Sep. 6, 2013

(65) Prior Publication Data
US 2015/0127272 A1    May 7, 2015

(30) Foreign Application Priority Data

Feb. 27, 2012 (SE) ........................................ 1200122

(51) Int. Cl.
*G01M 13/00* (2019.01)
*G01P 3/00* (2006.01)

(52) U.S. Cl.
CPC ............... *G01M 13/00* (2013.01); *G01P 3/00* (2013.01)

(58) Field of Classification Search
CPC .. G01M 13/00; G01M 13/028; G01M 13/045; G01M 1/28; G07C 3/00;
(Continued)

(56) References Cited

U.S. PATENT DOCUMENTS 5,474,813 A * 12/1995 Walker .................. G01H 1/003
427/510
7,313,484 B2 * 12/2007 Lindberg ............... G01H 1/003
702/34
(Continued)

FOREIGN PATENT DOCUMENTS

EP       2378382 A2   10/2011
WO    03062771 A1    7/2003

*Primary Examiner* — Leslie J Evanisko
*Assistant Examiner* — Leo T Hinze
(74) *Attorney, Agent, or Firm* — Garcia-Zamor Intellectual Property Law; Ruy Garcia-Zamor; Bryan Peckjian

(57) ABSTRACT

The present invention relates to a measurement device for a rotating system, the measurement device providing a first sensor arranged in the vicinity of a shaft of the rotating system, the first sensor being configured to generate a signal relating to a rotation of the shaft, and a control unit connected to the first sensor. The control unit is further configured to form a first parameter based on the signal from the first sensor, determine a current time reference, form a data package having the first parameter and a time stamp relating to the current time reference, and distribute the data package to at least one monitoring device over a network connected to the control unit. The present invention also relates to a monitoring system having the measurement device and a corresponding method for monitoring a condition of a rotating system.

7 Claims, 3 Drawing Sheets

(58) Field of Classification Search
CPC .. G01H 1/003; G05B 23/024; G05B 23/0221; F03D 17/00; F03D 7/046; G01P 3/00
See application file for complete search history.

(56) References Cited

U.S. PATENT DOCUMENTS

| | | | | |
|---|---|---|---|---|
| 7,328,130 | B2* | 2/2008 | Wiles | G01M 13/025 |
| | | | | 702/183 |
| 8,090,972 | B2* | 1/2012 | Bengtson | G05B 15/02 |
| | | | | 702/1 |
| 8,612,182 | B2* | 12/2013 | Hess | G05B 19/4062 |
| | | | | 702/190 |
| 2007/0032966 | A1 | 2/2007 | Song | |
| 2007/0043533 | A1 | 2/2007 | Wiles et al. | |
| 2008/0069693 | A1 | 3/2008 | Malakhova et al. | |
| 2010/0299550 | A1 | 11/2010 | Bengtson | |
| 2011/0020122 | A1 | 1/2011 | Parthasarathy et al. | |
| 2011/0313726 | A1 | 12/2011 | Parthasarathy et al. | |

* cited by examiner

CONDITION MONITORING SYSTEM

CROSS-REFERENCE

This application is the US national stage of International Application No. PCT/SE2013/000023 filed on Feb. 18, 2013, which claims priority to Swedish Patent Application No. 1200122-8 filed Feb. 27, 2012.

FIELD OF THE INVENTION

The present invention generally relates to condition monitoring of a rotating system, specifically to improved analysis performed by a monitoring system based on a time stamped signal from a tachometer.

TECHNICAL BACKGROUND

Condition monitoring is widely applied to determine a current and possible future status of mechanical machinery, including for example rotational systems such as turbines, generators, railway, and other industry processing equipment. Generally, data relating to temperature, rotation, vibration, etc, is analyzed for determining a change in operation, possibly initiating predictive maintenance of the rotating system for securing a long lifetime as well as reducing down time in case of equipment failure. There exist different techniques for performing condition monitoring of rotational systems, including frequency analysis of a vibration signal generated by a vibration sensor arranged in the vicinity of e.g. a rolling element bearing of the rotational system. In regards to e.g. rolling element bearings, the failure modes tend to be the degradation of those bearings, which typically exhibit an increase in characteristic frequencies associated with the bearing geometries and constructions that accordingly may be identified through frequency analysis.

An example of a monitoring system employing the above technique is disclosed in US2011/0020122 A1, describing a computer implemented method where condition information from a plurality of condition detection sensors coupled to a wind turbine are received by a centralized wind turbine controller. In US2011/0020122 A1, an anomaly detection algorithm is applied to identify maintenance activities for the wind turbine as a function of both the wind turbine condition information and the wind turbine controller information. Even though the monitoring technique disclosed in US2011/0020122 A1 provides a promising approach for reducing down time in a wind turbine, the use of a centralized controller puts high constraints on the reliability of communication within the monitoring system for securing essential real-time processing of the condition information. Such an approach will for example place limitations on the monitoring system in case future up-scaling of the system is desirable.

Accordingly, there is a need for improvements relating to distribution of condition information within a monitoring system, for allowing simplified up-scaling of the system in case of introduction of further condition detection sensors, as well as allowing for improvements in essential real-time processing of the condition information.

SUMMARY OF THE INVENTION

According to a first aspect of the present invention, there is provided a measurement device for a rotating system, the measurement device comprising a first sensor arranged in the vicinity of a shaft of the rotating system, the first sensor being configured to generate a signal relating to a rotation of the shaft, and a control unit connected to the first sensor, wherein the control unit is further configured to form a first parameter based on the signal from the first sensor, determine a current time reference, form a data package comprising the first parameter and a time stamp relating to the current time reference, and distribute the data package to at least one monitoring device over a network connected to the control unit.

The present invention is based on the realization that it may be possible to improve processing of condition related data by time stamping parameters relating to the rotation of a shaft of the rotating system, and distribute that information over a network to e.g. monitoring devices where further processing may be done.

In the proposed implementation, data from a sensor configured for providing indications of a rotation of the shaft is time stamped and arranged in a format suitable for distribution over a network, where at least one further electronic device, such as a monitoring device, may receive the information and include it in further calculations. Advantages includes the possibility to in a more generic way share the rotational related information between a large plurality of electronic devices, e.g. including monitoring devices, without having to resort to complicated wiring and amplifiers which is commonly used in prior art monitoring systems when rotational related information is distributed to more than one further electronic device or over a larger distance. Rather, according to the invention it may be possible to use an already available network, wired or wireless, for distributing the rotational related information.

It should be noted that, within the context of the application, the expression "data package" should be interpreted broadly, including different configurations and implementations. For example, within the context of the invention, a stream of loss tolerant data could be generated, including e.g. a 'tuple' where measured parameter and time references are organized together for further distribution.

For optimizing the result achievable by means of the invention, the measurement device and the monitoring device are preferably time synchronized, to a suitably extent. This may for example be achieved using a local time reference provided to the measurement device and further distributed to the monitoring device. However, it may also be possible to provide a global synchronization of the measurement device and the monitoring device, for example using an externally arranged source providing the current time reference. In such an embodiment, the measurement device may further comprise an interface connecting the control unit to the external time reference, for example being at least one of a GPS (or any similar satellite navigation system), a device providing terrestrial radio time signals, or a computer based time reference, e.g. a time server (UTC). Also, at least one of the measurement device and the monitoring device may be configured to indicate if the two devices falls out of synch, e.g. if the time synchronization between the two devices differs with more than a predefined time duration.

For generating the signal relating to a rotation of the shaft, the first sensor may comprise at least one of a hall-effect sensor, eddy-current sensor and an optical sensor. Other implementation for generating a tachometer signal may be possible and is considered to be within the scope of the invention.

In a preferred embodiment of the invention, the measurement device as discussed above is comprised in a monitoring system further comprising at least one monitoring device, and a network connecting the measurement device and the monitoring device. Preferably, the monitoring device is configured to receive a data package from the measurement device, extract the first parameter and the thereto related time stamp, receive a second parameter from a second sensor connected to the monitoring device and arranged to monitor one of a plurality of predetermined operational conditions of the rotating system, and perform a time based correlation between the first and the second parameter.

Advantageously, the monitoring device may be configured to comprise a buffer for storing a plurality of parameters from the second sensor. By including a buffer with the monitoring device it is possible to handle possible network related delays when transmitting data packages between the measurement and the monitoring device. The buffer may possibly be arranged to dynamically adjust its size depending on previously identified network delays.

The monitoring device is preferably used in relation to performing frequency, phase and/or order analysis of vibrations generated during operation of the rotating system. Accordingly, the second sensor is preferably a vibration sensor arranged to monitor a vibration of the rotating system. The vibration may for example relate to a shaft, main bearing, motor, gearbox, or any other element of the rotating system. As stated above, failure of a rotating system, or specifically a main bearing of the rotating system, tend to be the degradation of the bearing, which typically exhibits an increase in characteristic frequencies associated with the bearing geometries and constructions that accordingly may be identified through frequency, phase and/or order analysis.

Alternatively, it may also be possible to instead, or also, measure an operational temperature of an element of the rotating system, a torque level of the shaft of the rotating system, a current of a motor or a generator connected to the shaft of the rotating system. More specifically, within the scope of the present invention, any dynamic signal that may make use of accurate measurements relating to the rotation of the shaft of the rotating system may be correlated with the rotational related data from the tachometer arranged in vicinity of the shaft of the rotating system. Still further, the second sensor may e.g. be a second tachometer sensor arranged at a distance from the first sensor and thereby allowing for determining a possible torsion of the shaft of the rotating system.

According to another aspect of the present invention, there is provided a method for monitoring a condition of a rotating system, comprising receiving a data package over a network from a measurement device comprising a first sensor arranged in the vicinity of a shaft of the rotating system, the data package comprising a first parameter relating to a rotation of the shaft and a thereto related time stamp, receiving a second parameter from a second sensor, the second sensor arranged to monitor one of a plurality of predetermined operational conditions of the rotating system, and performing a time based correlation between the first and the second parameter, determining a condition of the rotating system based on the correlation, and communicating the condition to an externally arranged device. Further effects and features of this aspect of the present invention are largely analogous to those described above in connection with the first aspect of the invention.

It should be noted that the externally arranged device for example may be a management server for storing the determined condition. However, the external device may also be a condition communication device, such as a device providing a warning (e.g. a warning signal by means of sound and/or light) if a specific condition is determined and personnel is needed for handling the condition. The condition may also be provided to a display unit for illustrating the condition to e.g. an operator of the rotating system.

According to still another aspect, there is provided a computer program for causing a computer to apply the method as discussed above. Also this aspect provides similar advantages as discussed above. The computer readable medium may be one of a removable nonvolatile random access memory, a hard disk drive, a floppy disk, a CD-ROM, a DVD-ROM, a USB memory, an SD memory card, or a similar computer readable medium known in the art.

Other objectives, features, and advantages of the present invention will appear from the following detailed disclosure, from the attached dependent claims as well as from the drawings.

BRIEF DESCRIPTION OF THE DRAWINGS

These and other aspects of the present invention will now be described in more detail with reference to the appended drawings showing an example embodiment of the invention, wherein.

DETAILED DESCRIPTION OF PREFERRED EMBODIMENTS OF THE INVENTION

Figure 1:
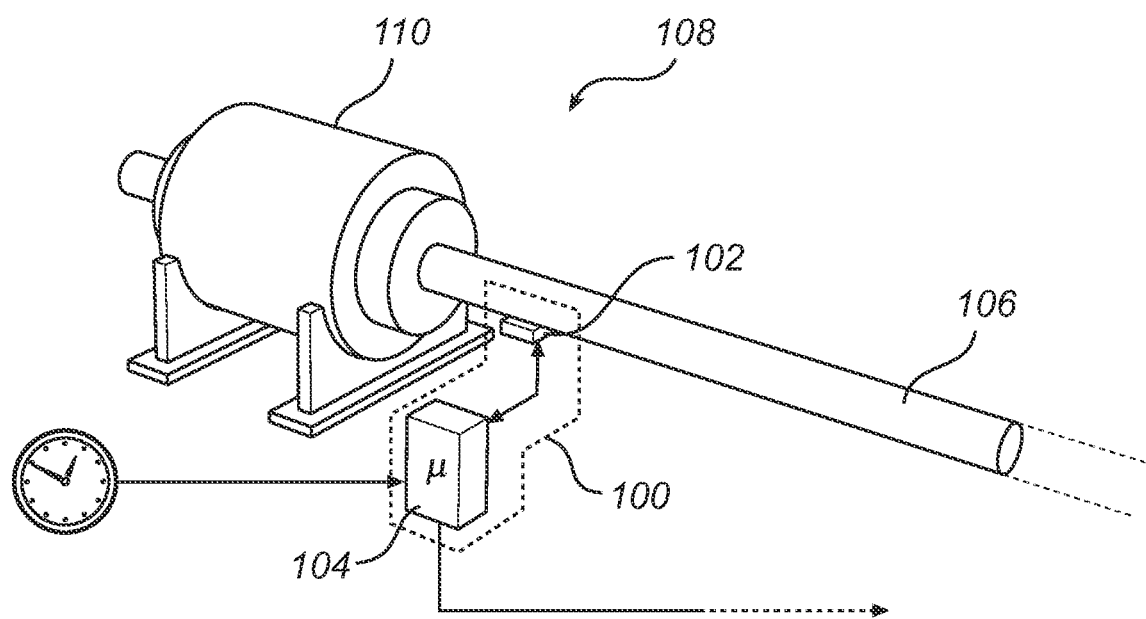
FIG. 1 schematically exemplifies a measurement device according to a currently preferred embodiment of the invention.

The present invention will now be described more fully hereinafter with reference to the accompanying drawings, in which currently preferred embodiments of the invention are shown. This invention may, however, be embodied in many different forms and should not be construed as limited to the embodiments set forth herein; rather, these embodiments are provided for thoroughness and completeness, and fully convey the scope of the invention to the skilled addressee. Like reference characters refer to like elements throughout.

Turning now to the drawings and to FIG. 1 in particular, it is schematically illustrated a measurement device 100 according to an embodiment of the invention. The measurement device 100 comprises a tachometer 102 and a control unit 104 configured to receive sensor data from the tachometer 102. In FIG. 1 the measurement device 100 is arranged to measure the rotational speed (or angle of rotation) of a shaft 106 of a rotating system 108, the rotating system 108 possibly further comprising a motor 110. The tachometer 102 is installed proximate the shaft 106, and configured to generate sensor data being indicative of the rotational speed of the shaft 106. The control unit 104 preferably has internal timing means for providing a current time reference. Alternatively, the control unit 104 may comprise an interface for receiving a time reference for example from an external source, such as from an externally arranged network connected time server providing time synchronization for the control unit 104. Still further, the control unit 104 may receive a satellite based time reference (e.g. GPS signal or similar) providing time synchronization for the control unit 104 with even higher accuracy than what currently may be achieved using the network connected server. In the illustrated example the measurement device 100 is illustrated as comprising separate parts (i.e. the tachometer 102 and the control unit 104). However, it should be noted that the parts may be integrated into one single structure, providing both the sensor and computation functionality.

The control unit 104 may include a microprocessor, a microcontroller, a programmable digital signal processor or another programmable device. The control unit 104 may also, or instead, include an application specific integrated circuit (ASIC), reduced instruction set computer (RISC), a programmable gate array programmable array logic, a programmable logic device, or a digital signal processor. Where the control unit 104 includes a programmable device such as the microprocessor or microcontroller mentioned above, the processor may further include computer executable code that controls operation of the programmable device, possibly stored within a storage element/memory of the control unit 104. During operation of the rotating system 108, the motor 110 will initiate a rotation of the shaft 106. During rotation of the shaft the adjacently arranged tachometer 102 will start to generate a stream of data relating to at least one of the angle of rotation or the rotational speed of the shaft 106. The control unit 104 receives the data from the tachometer 102 and forms a first parameter based on the tachometer data, the parameter for example comprising the rotational speed, the angle of rotation, or an indication as to when a specific point of the shaft 106 passes the sensor element of the tachometer 102. The first parameter is packaged together with a time stamp being a current time reference, for forming a time stamped data package comprising information as to the rotation of the shaft 106, that may be further distributed to additional monitoring devices and/or equipment (not shown explicitly in FIG. 1) provided for monitoring for example the condition of operation of the rotating system 108.

Figure 2:
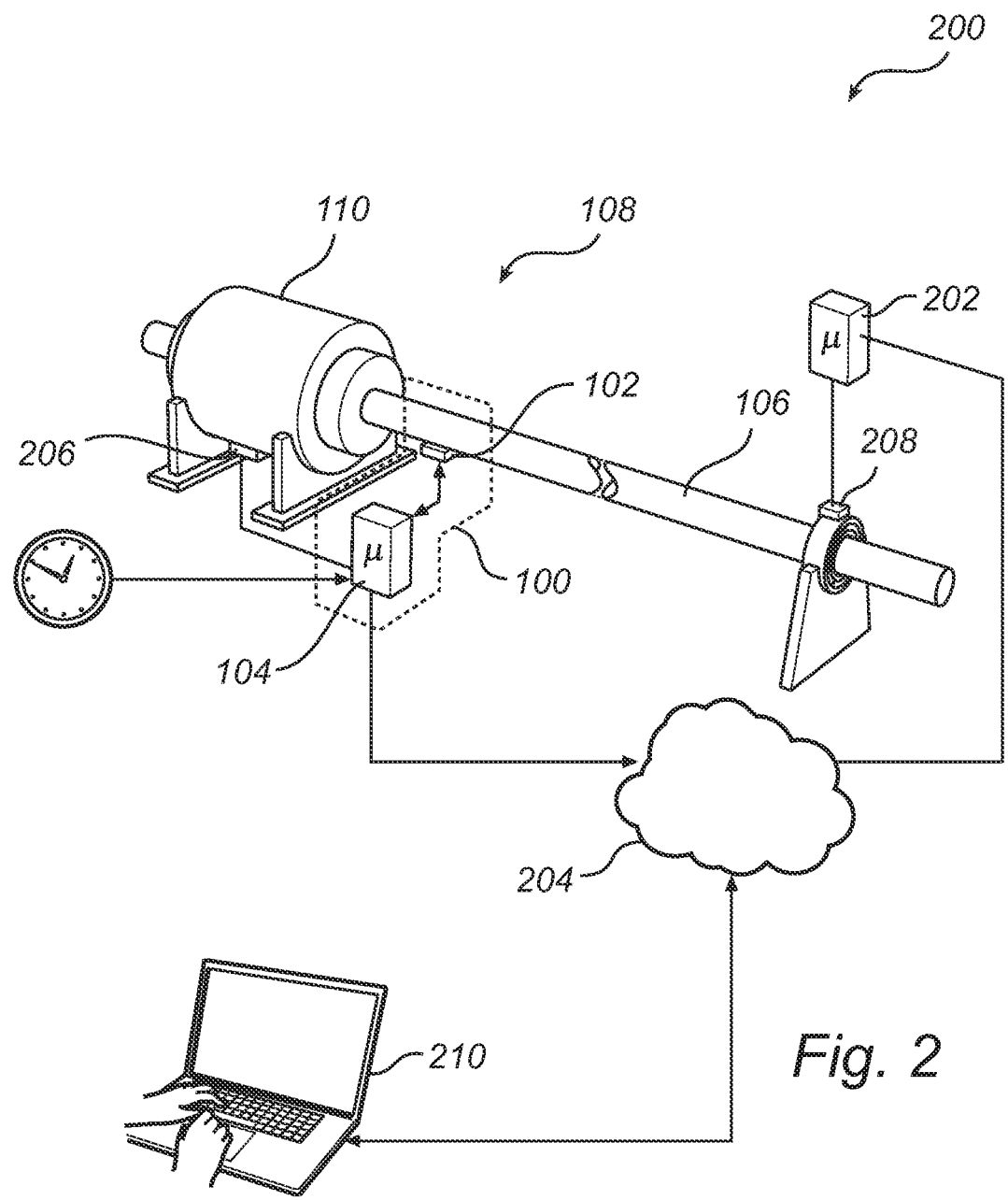
FIG. 2 shows a rotating system comprising a monitoring system according to the invention.

In FIG. 2, there is provided a schematic illustration of a measurement system 200 for a rotating system 108 as shown in FIG. 1. The measurement system 200 is provided for monitoring a condition of the rotating system 108, and comprises distributed monitoring elements in the form of the measurement device 100 as discussed above in relation to FIG. 1, as well as a further monitoring device 202, where the measurement device 100 and the monitoring device 202 are connected to each other by means of a network connection 204, for example using an Ethernet or Internet connection (being e.g. wired or wireless). Furthermore, the monitoring device 202 is time synchronized with the measurement device 100 for allowing proper time correlation of measurement values generated by sensors connected to the measurement device 100 as well as the monitoring device 202.

In the illustrated embodiment, the measurement device 100 comprise an interface for allowing the connection of a further sensor, e.g. a vibration sensor 206 arranged to monitor a level of vibration of the motor 110 of the rotating system 108. The vibration sensor 206 may comprise a displacement sensor, velocity sensor or accelerometer that is configured to provide information that represents the vibration of various components of the motor 110. Accelerometers are the most commonly used vibration sensors. The sensors may also provide information that indicates vibration, inclination, dynamic distance or the speed of various components within the motor 110.

In a similar manner as discussed above, sensor data provided by the vibration sensor 206 may be used when forming a time stamped data package that may be distributed over the network connection 204 to further monitoring elements provided for monitoring the condition of the rotating system.

The monitoring device 202 may be a similar device as the measurement device 100, e.g. comprising a control unit, or a more advanced computing device or server. The monitoring device 202 comprises interfaces for allowing connection of e.g. a plurality of vibration sensors 208, temperature sensor(s) (not shown), etc.

In the illustrated embodiment, the monitoring device 202 is provided a distance from the measurement device 100, and the vibration sensor 208 is arranged to monitor the vibration of e.g. a bearing for the shaft 106 of the rotating system 108. The monitoring device 202 further comprises a storage unit/memory for storing data from the vibration sensor 208, and is configured to, in a similar manner as discussed above, time stamp the data from the vibration sensor 208. In the illustrated embodiment the monitoring device 202 and the vibration sensor 208 are provided as separate parts. However, as discussed above, they may also be integrated as one element.

Figure 3:
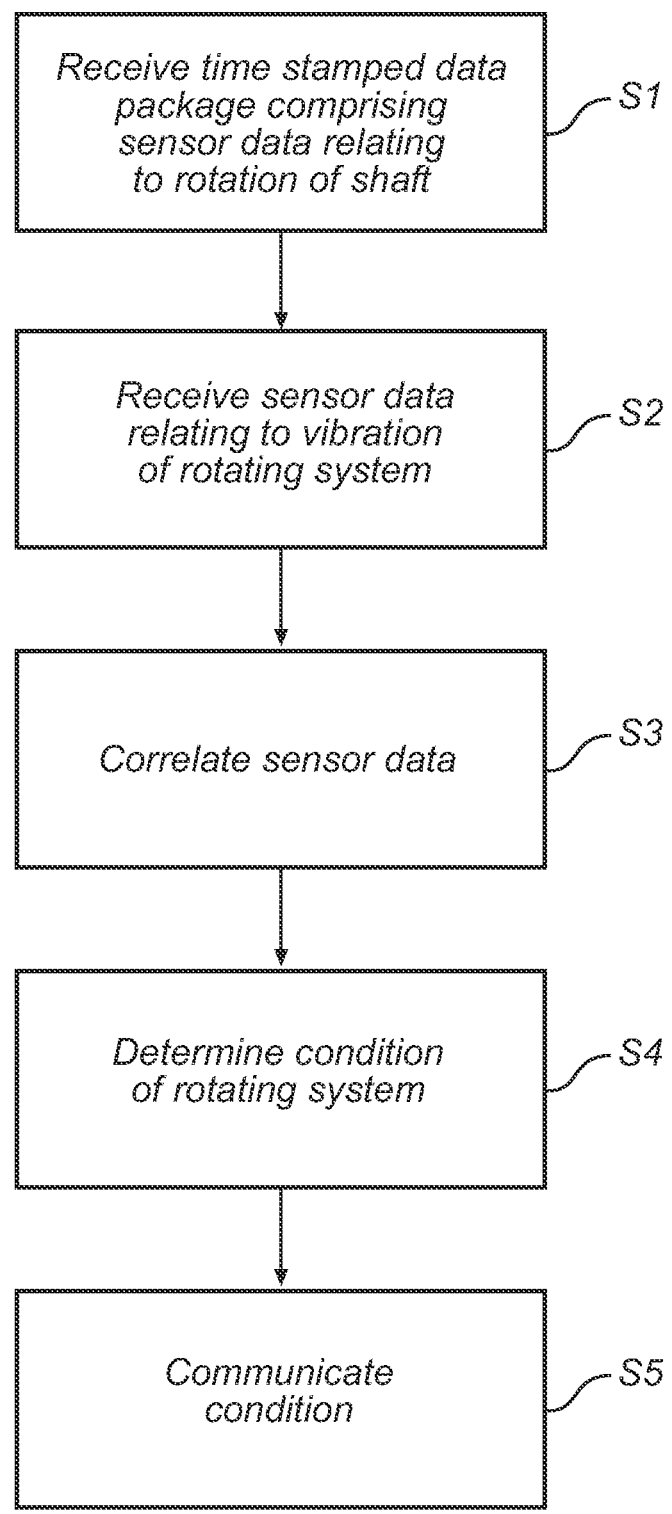
FIG. 3 is a flow chart outlining the general steps of a method according to a currently preferred embodiment of the invention.

During operation of the monitoring system 200, with further reference to FIG. 3, when the rotating system 110 is activate and the shaft 108 is rotating, data is generated by the sensors of the measurement device 100, including information relating to the speed of rotating of the shaft 108 (or angle of rotation) and vibration of the motor 108. The data is time stamped and packaged in a data package by the measurement device 100 and transmitted using the network connection 204 and received, S1, by the monitoring device 202. Further data from vibration sensor 208 is also received, S2, by the monitoring device 202.

Advanced correlation, S3, and analysis of the data from the sensors of the measurement device 100 and the data from the sensors of the monitoring device 202 is made possible by the fact that data from all of the sensors are time stamped and thus may be time correlated with each other, preferably for determining, S4, a condition of the rotating system 110. Specifically, even though the data from the measurement device 100 when transmitted to the monitoring device 202 possibly may be time delayed due to e.g. congestions within the network connection 204, the feature of time stamping the data from the sensors connected to the measurement device 100 allows this data to be exactly "time fitted" with data from the sensors connected to the monitoring device 202 being time stamped and stored in the memory of the monitoring device 202.

For example, by means of the illustrated embodiment it may be possible to perform e.g. frequency, phase and/or order analysis based on all data provided by the sensors of the monitoring system 200, e.g. tachometer 102 and vibration sensors 206 and 208. Put differently, by means of the illustrated embodiment, it will be possible to perform e.g. frequency, phase and/or order analysis on synchronously sampled data, even though the data was collected using different monitoring elements distributed around the rotating system 110 and communicated using the possibly time delayed network connection 204.

Essentially, the analysis performed by the monitoring device 202 may take the rotational data from the tachometer sensor 102 into account as if the tachometer sensor 102 was connected directly to the monitoring device 202. Further, any network delays will be handled by the storage unit/memory, buffering data from e.g. the vibration sensor 208, for correct time fitting of data from different sensors. Additionally, similar types of analysis may be performed by even a large plurality of further monitoring devices (not shown), each connected to further condition monitoring sensors, that in a similar manner may take the data from the tachometer sensor 102 into account as if the tachometer sensor 102 was directly connected to each of the mentioned further monitoring devices. Accordingly and as discussed above, the data from the tachometer sensor 102 may be distributed to a plurality of devices for monitoring a condition of the rotating system 108, without having to resort to complicated additional tachometer data distribution networks involving e.g. expensive amplifiers, etc. It should be noted, the general concept of frequency, phase and order analysis of a rotating system is well known for the person skilled in the art and will not be further elaborated.

Preferably, the condition of the rotating system is communicated, S5, to an externally arranged device, such as a management server 210 where further analysis may be done, the condition stored, and possible scheduling of service may be initiated. Alternatively, the condition is provided to e.g. a device providing a warning (e.g. a warning signal) if a specific condition is determined and personnel is needed for handling the condition.

As discussed, the measurement device 100 and the monitoring device 202 are time synchronized with each other. In case any problems relating to the time synchronization between the measurement device 100 and the monitoring device 202 is indicated, it is possible to determining a possible timing error.

Within the context of the invention it is possible to distribute information relating to any possible timing errors using the network connection 204, e.g. for including a timing accuracy with the frequency, phase and/or order analysis. In case the timing error is determined to be larger that a predetermined level, a warning may be generated that e.g. is distributed to an overall monitoring functionality of the monitoring system 200, indicating that any possible results from the frequency, phase and/or order analysis may be faulty due to a large timing error relating to the rotational speed or angle or rotation of the shaft 108.

The person skilled in the art realizes that the present invention by no means is limited to the preferred embodiments described above. On the contrary, many modifications and variations are possible within the scope of the appended claims. Additionally, variations to the disclosed embodiments can be understood and effected by the skilled person in practicing the claimed invention, from a study of the drawings, the disclosure, and the appended claims. In the claims, the word "comprising" does not exclude other elements or steps, and the indefinite article "a" or "an" does not exclude a plurality. The mere fact that certain measures are recited in mutually different dependent claims does not indicate that a combination of these measured cannot be used to advantage.

The invention claimed is:

1. A monitoring system for a plurality of rotating systems communicating via a network, the monitoring system being configured to monitor a plurality of conditions of each of the plurality of rotating systems, the monitoring system comprising:
　each of the plurality of rotating systems having a shaft which is rotatable and further comprising:
　　at least one measurement device comprising:
　　　a first sensor arranged in the vicinity of the shaft, the first sensor being a first tachometer configured to generate a tachometer signal relating to a rotation of the shaft;
　　　a control unit connected to the first sensor; wherein the control unit is further configured to:
　　　　form a first parameter based on the tachometer signal from the first sensor,
　　　　determine a current time reference,
　　　　form a data package by at least time stamping the tachometer signal with the current time reference to enable exact time fitting of the data package with data of alternative sensors connected to the rotating system, and
　　　　distribute the data package to a monitoring device over a network connected to the control unit, network congestions causing the network to experience a time delay in the distribution of the data package from the control unit to the monitoring device,
　the monitoring device is configured to:
　　receive the data package from the at least one measurement device,
　　extract the first parameter and the related time stamp,
　　receive a second parameter from a second sensor connected to the monitoring device and arranged to monitor one of a plurality of predetermined operational conditions of the rotating system, wherein the second sensor comprises a second tachometer sensor arranged at a distance from the first sensor and configured to determine a torsion of the shaft of the rotating system, and
　　wherein the monitoring device performs a time based correlation between the first parameter and the second parameter to generate synchronously sampled data; and
　　an interface connecting the control unit to an external device providing terrestrial radio time signals to globally synchronize and optimize the distribution of the data package between the at least one measurement device and the monitoring device,
　　wherein the monitoring device, based on the global synchronization of the data package, utilizes the current time reference in a comparison to determine whether a time synchronization between the at least one measurement device and the monitoring device differs by more than a predefined time duration,
　　wherein a timing error is determined when the time synchronization between the at least one measurement device and the monitoring device differs by more than the predefined time duration, a warning is generated and distributed to a management server when the timing error is determined to be larger than the predefined time duration, wherein the warning indicates results from a frequency, phase, and order analysis performed by the monitoring device on the synchronously sampled data, and
　　wherein the monitoring device time fits the data package with data from the second parameter received from the second sensor, the monitoring device comprising a buffer for storing the second parameter prior to time fitting the second parameter into the data package to compensate for the time delay in the transmission between the control unit and the monitoring device, the buffer being configured to dynamically adjust in size based on the time delay, when the time synchronization between the at least one measurement device and the monitoring device does not differ by more than the predefined time duration,
　the management server is configured to receive at least one of the warning and the data package after time fitting of the second parameter therein from the monitoring device of each of the plurality of rotating systems, the management server being configured to perform additional analysis on the data package from each of the plurality of rotating systems and to determine if service should be scheduled for any one of the plurality of rotating systems.

2. The monitoring system according to claim 1, wherein the monitoring device comprises a buffer for storing a plurality of parameters from the second sensor.

3. The monitoring system according to claim 1, wherein the second sensor is arranged to monitor at least one of an operational temperature of an element of the rotating system, a torque level of the shaft of the rotating system, a current of a motor or a generator connected to the shaft of the rotating system.

4. The monitoring system according to claim 1, wherein the monitoring device is further configured to perform the frequency, phase, and order analysis based on at least the information provided by the first and the second sensors.

5. A method for monitoring a condition of a rotating system, comprising:
receiving a data package over a network comprising:
a first parameter from a first sensor, the first sensor comprising a first tachometer sensor arranged in the vicinity of a shaft of the rotating system configured to generate a tachometer signal relating to a rotation of the shaft and a time stamp corresponding to a current time reference, the time stamp enabling exact time fitting of the data package with data of alternative sensors connected to the rotating system, network congestions causing the network to experience a time delay in the receiving of the data package;
a second parameter from a second sensor, the second sensor comprising a second tachometer sensor arranged at a distance from the first sensor, configured to generate a tachometer signal to monitor one of a plurality of predetermined operational conditions including a torsion of the shaft of the rotating system;
performing a time based correlation between the first and the second parameters to generate synchronously sampled data;
determining a condition of the rotating system based on the correlation; and
communicating the condition to a management server,
wherein the time stamp is based on terrestrial radio time signals of an external device to globally synchronize and optimize the distribution of the data package between a measurement device and the management server, wherein the measurement device, based on the global synchronization of the data package, utilizes the current time reference in a comparison to determine whether a time synchronization between the measurement device and a monitoring device differs by more than a predefined time duration, wherein a timing error is determined when the time synchronization between the measurement device and the monitoring device differs by more than the predefined time duration, a warning is generated and distributed when the timing error is determined to be larger than the predefined time duration, wherein the warning indicates results from a frequency, phase, and order analysis performed by the monitoring device, and
wherein the monitoring device time fits the data package with data from the second parameter received from the second sensor, the monitoring device comprising a buffer for storing the second parameter prior to time fitting the second parameter into the data package to compensate for the time delay in the transmission between the control unit and the monitoring device, the buffer being configured to dynamically adjust in size based on the time delay.

6. The method according to claim 5, wherein the externally arranged device is at least one of a management server and a condition communicating device.

7. A non-transitory computer readable medium on which a computer program for causing a computer to apply the method of claim 5.

* * * * *